(12) United States Patent
Lang et al.

(10) Patent No.: US 7,805,667 B2
(45) Date of Patent: Sep. 28, 2010

(54) SYSTEM AND METHOD FOR IDENTIFYING TARGET NODE GRAPHS FROM PREDETERMINED SEED NODE SUBSETS

(75) Inventors: Kevin J. Lang, Mountain View, CA (US); Vivek B. Tawde, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 965 days.

(21) Appl. No.: 11/635,404

(22) Filed: Dec. 6, 2006

(65) Prior Publication Data

US 2008/0140358 A1 Jun. 12, 2008

(51) Int. Cl.
*G06F 17/00* (2006.01)
(52) U.S. Cl. .................................. 715/206; 715/215
(58) Field of Classification Search ................. 715/853, 715/206, 208, 205, 215; 345/440
See application file for complete search history.

(56) References Cited

U.S. PATENT DOCUMENTS

| | | | | |
|---|---|---|---|---|
| 5,444,842 | A * | 8/1995 | Bentson et al. | 715/854 |
| 6,665,837 | B1 * | 12/2003 | Dean et al. | 715/234 |
| 7,215,337 | B2 * | 5/2007 | Heer et al. | 345/440 |
| 2003/0176931 | A1 * | 9/2003 | Pednault et al. | 700/31 |
| 2004/0024739 | A1 * | 2/2004 | Copperman et al. | 707/1 |
| 2005/0210008 | A1 * | 9/2005 | Tran et al. | 707/3 |
| 2006/0036564 | A1 * | 2/2006 | Yan et al. | 707/1 |
| 2006/0112027 | A1 * | 5/2006 | Okamoto et al. | 706/14 |
| 2006/0122998 | A1 * | 6/2006 | Bar-Yossef et al. | 707/5 |
| 2006/0271564 | A1 * | 11/2006 | Meng Muntz et al. | 707/100 |
| 2007/0097959 | A1 * | 5/2007 | Taylor | 370/352 |
| 2009/0055476 | A1 * | 2/2009 | Markus et al. | 709/204 |

OTHER PUBLICATIONS

Luo, B., et al, "Spectral Embedding of Graphs", Pattern Recognition, vol. 36, Issue 10, Oct. 2003, pp. 2213-2230.*
Miller, Gary L., et al, "Separators for Sphere-Packings and Nearest Neighborhood Graphs", Journal of the ACM, vol. 44, Issue 1, Jan. 1997, pp. 1-29.*
Boldi, Paolo, et al, "The Web Graph Framework I: Compression Techniques", WWW '04, 2004, pp. 595-602.*
Broder, Andrei, et al, "Graph Structures in the Web", Computer Networks, 33(1-6), 2000, pp. 309-320.*
Capocci, Andrea, et al, "Communities Detection in Large Networks", WAW 2004: Algorithms and Models for the Web-Graph: third international workshop, 2004, pp. 181-187.*
Flake, G.W., et al, "Efficient Identification of Web Communities", KDD '00, New York, NY, 2000, ACM Press, pp. 150-160.*
Geraci, Flippo, et al, "A Scalable Algorithm for High-Quality Clustering of Web Snippets", Proceedings of the 21st Annual ACM Symposium on Applied Computing (SAC 2006), Apr. 2006, pp. 1-5.*
Gulli, A., et al, "The Indexable Web is More Than 11.5 Billion Pages", WWW (Special interest tracks and posters), 2005, pp. 1-2.*
Ino, Hidehiko, et al, "Partitioning of Web Graphs by Community Topology", WWW '05, ACM Press, 2005, pp. 661-669.*

* cited by examiner

*Primary Examiner*—Laurie Ries
(74) *Attorney, Agent, or Firm*—Stattler-Suh PC

(57) ABSTRACT

A system and method to identify target node graphs from predetermined seed node subsets are described. A one-sided constrained spectral embedding of a graph using a predetermined set of seed nodes within the graph is computed. Next, a threshold boundary is identified to define a target area for a target subgraph within the embedded graph using predetermined network-flow calculations, the target subgraph including the predetermined set of seed nodes. Finally, the target subgraph is identified based on the calculated threshold boundary.

13 Claims, 6 Drawing Sheets

SYSTEM AND METHOD FOR IDENTIFYING TARGET NODE GRAPHS FROM PREDETERMINED SEED NODE SUBSETS

TECHNICAL FIELD

The present invention relates generally to the field of computer systems and, more particularly, to a system and method to identify target node graphs from predetermined seed node subsets are described.

BACKGROUND OF THE INVENTION

Expanding a seed set of nodes into a larger community is a common procedure in link-based analysis. The problem involves a small, but cohesive seed set of nodes in a graph, such as, for example, web pages, which must be expanded to generate the enclosing node community, such as, for example, a web community or communities. Although the seed expansion problem has been addressed as an intermediate step in various graph-based analyses on the web, existing techniques appear to be inefficient and provide less than optimal results.

Several techniques proposed for seed set expansion include methods that use spectral embedding, maximum flow, and parametric flow individually. However, each of these methods used individually appear to provide inadequate results. The spectral embedding methods, for example, result in an outer boundary that is approximate and inexact. The maximum flow methods grow a large candidate set and then shrink back to obtain a minimum cut, but may shrink back too much and thus obtain no expansion in the case of a small seed set. The parametric flow methods may produce quotient cuts that result in expansion sets unrelated to the seed set, but which happen to have low quotient scores.

Thus, what is needed is a system and method to identify target node graphs from predetermined seed node subsets that may yield accurate boundaries and can effectively grow the seed set to obtain related and accurate expansion sets.

SUMMARY OF THE INVENTION

A system and method to identify target node graphs from predetermined seed node subsets are described. A one-sided constrained spectral embedding of a graph using a predetermined set of seed nodes within the graph is computed. Next, a threshold boundary is identified to define a target area for a target subgraph within the embedded graph using predetermined network-flow calculations, the target subgraph including the predetermined set of seed nodes. Finally, the target subgraph is identified based on the calculated threshold boundary.

BRIEF DESCRIPTION OF THE DRAWINGS

The present invention is illustrated by way of example and not intended to be limited by the figures of the accompanying drawings in which like references indicate similar elements and in which.

DETAILED DESCRIPTION

In some embodiments described below, a target subgraph, such as, for example, a community of web pages, may be ascertained from a predetermined set of seed nodes, such as web pages, which is representative of the web community. The set of seed nodes may represent a collection of web pages identified by an application or source as relevant or related within a single website, or, in the alternative, may represent web pages from different web sites.

A community as used herein may mean a related group of objects. Accordingly, a community of web pages may mean a group of related web pages, and a community of nodes may mean a group of related nodes within a graph, such as, for example, the target subgraph. A web page may include any information that may be addressable by a Universal Resource Locator (URL), including, for example, a markup language document, a text document, an image, video content, audio content, and other information.

Figure 1:
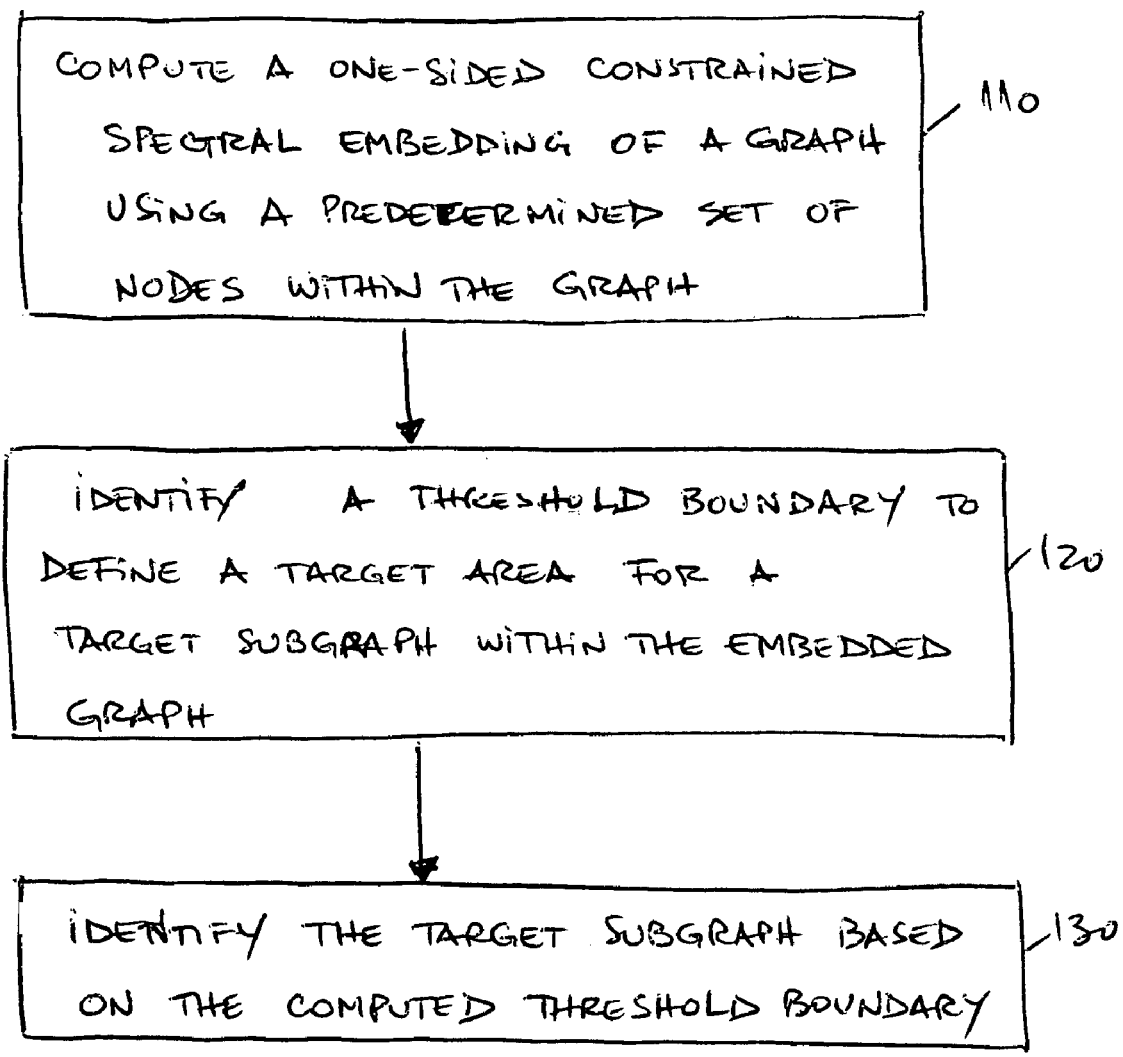
FIG. 1 is a flow diagram illustrating a method to identify target node graphs from predetermined seed node subsets, according to one embodiment of the invention.

FIG. 1 is a flow diagram illustrating a method to identify target node graphs from predetermined seed node subsets, according to one embodiment of the invention. As illustrated in FIG. 1, at processing block 110, a one-sided constrained spectral embedding of a graph using a predetermined set of seed nodes within the graph is computed, as described in further detail below, in connection with FIG. 3.

At processing block 120, a threshold boundary is identified to define a target area for a target subgraph within the embedded graph, the target subgraph including the predetermined set of seed nodes, as describe din further detail below in connection with FIG. 4. Finally, at processing block 130, the target subgraph is identified based on the calculated threshold boundary, as described in further detail below in connection with FIG. 5.

Figure 2:
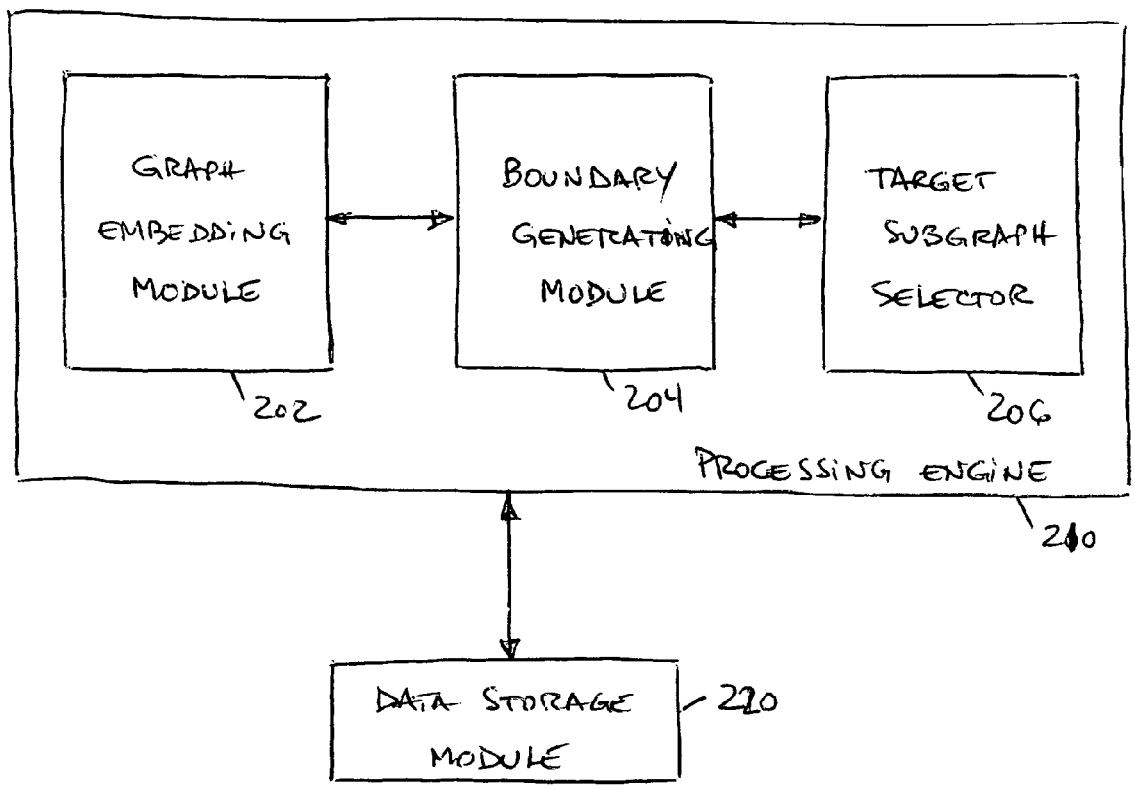
FIG. 2 is a block diagram illustrating an exemplary system architecture to identify target node graphs from predetermined seed node subsets, according to one embodiment of the invention.

FIG. 2 is a block diagram illustrating an exemplary system architecture to identify target node graphs from predetermined seed node subsets, according to one embodiment of the invention. While the system 200 includes components configured to implement the method to identify target node graphs from predetermined seed node subsets, it is to be understood that the functionality of such components may be implemented within separate components distinct from the system 200 or may be combined within a single apparatus. As shown in FIG. 2, the system 200, such as, for example, the computer system 600 described in detail in connection with FIG. 6, includes a processing engine 210 coupled to a data storage module 220.

In one embodiment, the processing engine 210 further includes a graph embedding module 202, a boundary generating module 204 coupled to the graph embedding module 202, and a target subgraph selector module 206 coupled to the boundary generating module 204.

In one embodiment, the graph embedding module 202 is a hardware and/or software module configured to perform spectral embedding of a graph using a predetermined set of seed nodes, as described in further detail below. The boundary generating module 204 is a hardware and/or software module configured to perform identification of a threshold boundary to define a target area for a target subgraph within the embedded graph, as described in detail below. Finally, the target subgraph selector module 206 is a hardware and/or software module configured to perform selection of the target subgraph based on the computed threshold boundary, as described in further detail below.

In one embodiment, the data storage module 220, which at least partially implements and supports the system 200, may include one or more storage facilities, such as a database or collection of databases, which may be implemented as relational databases. Alternatively, the data storage module 220 may be implemented as a collection of objects in an object-oriented database, as a distributed database, or any other such databases.

Figure 3:
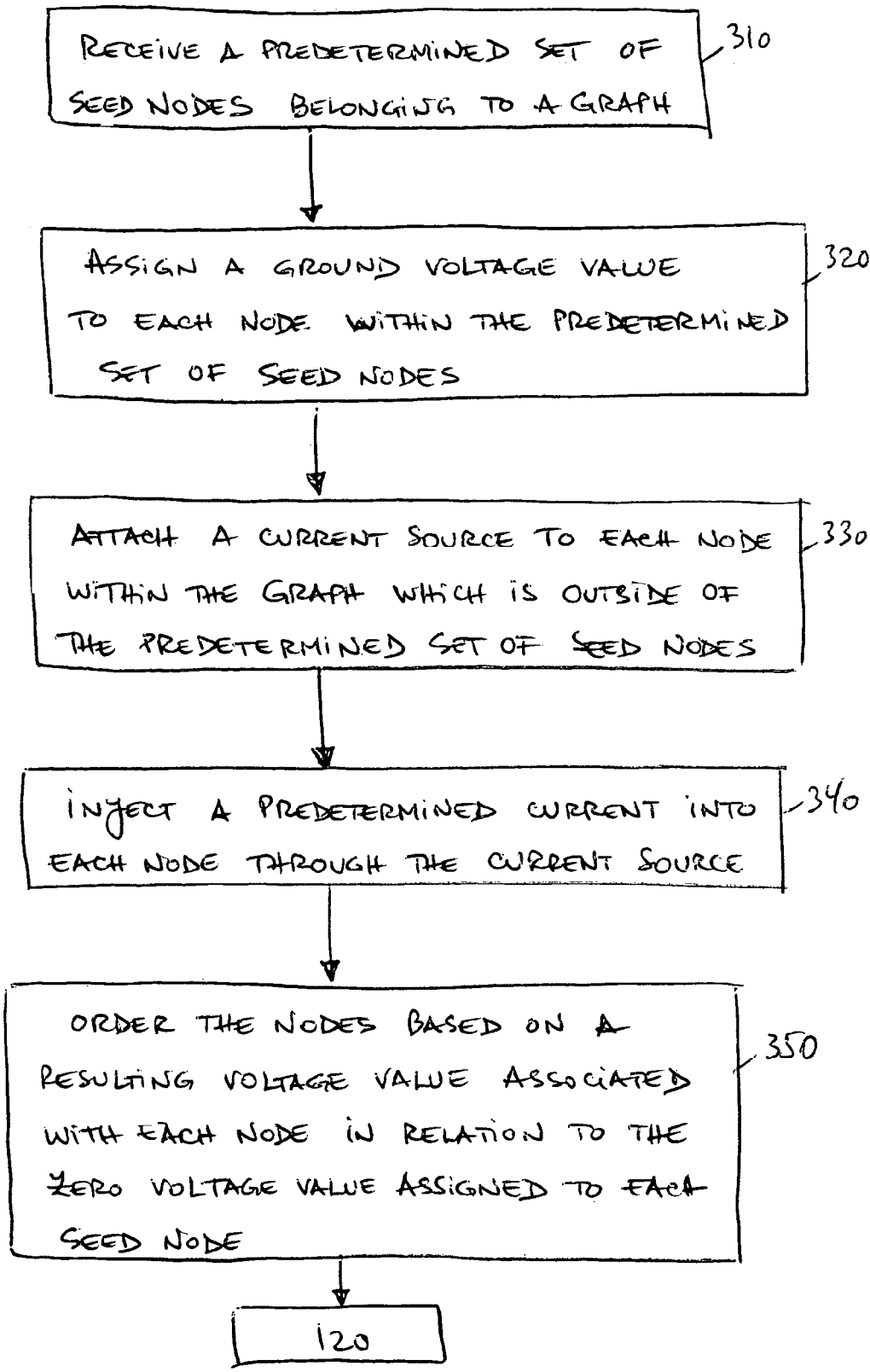
FIG. 3 is a flow diagram illustrating a method to perform spectral embedding of a graph using a predetermined set of seed nodes, according to one embodiment of the invention.

FIG. 3 is a flow diagram illustrating a method to perform spectral embedding of a graph using a predetermined set of seed nodes, according to one embodiment of the invention. As illustrated in FIG. 3, at processing block 310, a predetermined set of seed nodes belonging to a graph is received. In one embodiment, the graph embedding module 202 within the processing engine 210 receives the predetermined set of seed nodes from the graph stored within the data storage module 220.

In one embodiment, the graph G includes multiple nodes N and contains at least one unknown subgraph C separated from the rest of the graph G by a boundary/cut. The seed set containing the seed nodes is largely contained within such subgraph C, which may be interpreted as a community or data cluster and may be referred to as the target subgraph.

In one embodiment, the boundary/cut is a small cut, which contains a small amount of edge crossing the cut. Alternatively, the boundary/cut may be a cut that has a small value of one of several quotient-style evaluation metrics. For example, a quotient cut score, also known as cut sparsity and cut expansion, may be defined as the edge weight in the cut divided by the number of nodes separated from the main graph G. A normalized cut score, also known as the cut conductance, may be defined as the edge weight in the cut divided by the sum of the degrees of the nodes separated from the main graph G.

In an alternate embodiment, the graph embedding module 202 further receives additional information stored within the data storage module 220 and related to the graph G, such as, for example, the nodes N included in the graph G, and a pair of values, which define the size of the target subgraph C, such as, for example, a lower bound value L and an upper bound value U.

In one embodiment, the physical process described below uniquely specifies a linear system, which can be solved to obtain the spectral graph embedding. The voltages in this hypothetical circuit described below can be calculated using one of many known circuit analysis techniques, such as, for example, a nodal analysis discussed in "The Analysis and Design of Linear Circuits", chapter 2, by Roland E. Thomas. Nodal analysis produces a system of simultaneous linear equations that can be solved by Gaussian Elimination or by a known iterative method, for example, methods implemented in software packages such as LAPACK from netlib.org and/or ITL from the Open Systems Laboratory at Indiana University.

Referring back to FIG. 3, at processing block 320, the graph is conceptually converted into an electrical circuit, with a circuit node for each graph node, and a resistor for each graph edge. The electrical conductance of each resistor equals the weight on the graph edge. Then, a ground voltage value is assigned to each node within the predetermined set of seed nodes. In one embodiment, the graph embedding module 202 pins each seed node at a zero voltage value.

At processing block 330, a current source is attached to each node within the graph G but outside of the predetermined set of seed nodes. In one embodiment, the graph embedding module 202 connects every other node within the graph to a current source.

At processing block 340, a predetermined current is injected into the each node through the corresponding current source. In one embodiment, the graph embedding module 202 transmits a predetermined positive current, such as, for example, a current having an intensity of 1 Amper, to each node connected to a corresponding current source.

Finally, at processing block 350, the nodes are ordered based on a resulting voltage value associated with each node in relation to the zero voltage value assigned to each seed node. In one embodiment, the graph embedding module 202 orders the nodes to obtain a spectral embedding of the graph G on a horizontal axis, such that all the seed nodes are located at one end, having been assigned a zero voltage value, and all the other nodes being positioned on the horizontal axis based on their distance to the seed set, such that nodes that are more likely to be in the target subgraph C are closer to the seed set than nodes that tend to be outside of the target subgraph C. The graph embedding module 202 further transmits the ordering of nodes within the resulting embedded graph G to the boundary generating module 204 for further processing, as described in connection with block 120 shown in FIG. 1.

In alternate embodiments, other known methods may be used to perform a one-sided spectral embedding of the graph, such as, for example, a local random walks embedding method, as described in "Communities from Seed Sets," by Reid Andersen and Kevin J. Lang, published at the World Wide Web Conference 2006, May 23-26, 2006, Edinburgh, Scotland, which is incorporated by reference herein, or a personalized page rank embedding method, as described in "Local Graph Partitioning using PageRank Vectors," by Reid Andersen, Fan Chung, and Kevin Lang, which is also incorporated by reference herein.

Figure 4:
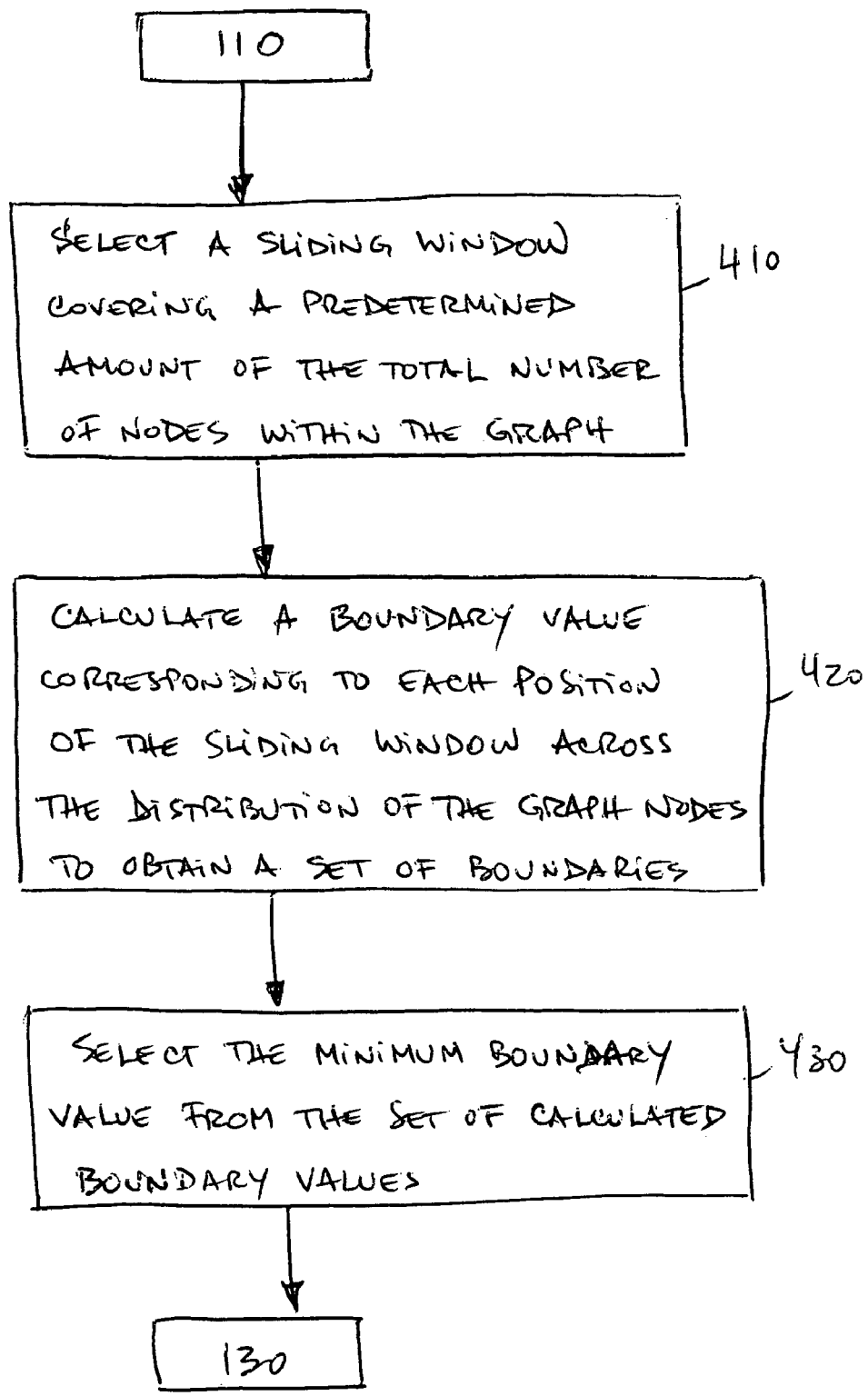
FIG. 4 is a flow diagram illustrating a method to generate a threshold boundary to define a target area within the embedded graph, according to one embodiment of the invention.

FIG. 4 is a flow diagram illustrating a method to generate a threshold boundary to define a target area within the embedded graph, according to one embodiment of the invention. As shown in FIG. 4, at processing block 410, a sliding window covering a predetermined amount of the total number of nodes within the embedded graph is selected. In one embodiment, the boundary generating module 204 receives the ordered nodes within the embedded graph G and selects a sliding window encompassing a predetermined amount of the total number of ordered nodes, such as, for example, 10 percent of the total probability. The selected window is configured to slide along the horizontal axis to highlight various groups of nodes within the graph G.

At processing block 420, a boundary value corresponding to each position of the sliding window across the distribution of the graph nodes is calculated to obtain a set of boundaries. In one embodiment, the boundary generating module 204 computes successively a boundary value, such as, for example, a cut, for each group of nodes contained within the sliding window. Subsequently, the boundary generating module 204 assembles all calculated boundary values into a set of boundaries/cuts associated with the embedded graph G.

Finally, at processing block 430, a minimum boundary value is selected from the set of calculated boundary values. In one embodiment, the boundary generating module 204 selects the minimum boundary value within the set of boundaries and transmits the minimum boundary/cut to the target subgraph selector module 206.

In an alternate embodiment, if the graph embedding module 202 receives the lower bound value L and the upper bound value U of the target subgraph C and transmits the values to the boundary generating module 204, and if the target subgraph C is bounded by a small cut, as described above, then the boundary generating module 204 first makes a conceptual copy of the graph G. Subsequently, the boundary generating module 204 contracts the first L nodes in the ordering of nodes within the embedded graph G into a single source node S. The boundary generating module 204 then contracts the final N-U nodes in the ordering of nodes into a single sink node T.

Thus, the resulting ST maximum flow problem may be solved to obtain a maximum flow value from the source node S to the sink node T and a minimum boundary/cut using one of many known techniques, described, for example, in "On Implementing Push-Relabel Method for the Maximum Flow Problem," by B. V. Cherkassky and A. V. Goldberg (1995), in Proceedings of the 4$^{th}$ International IPCO Conference, Lecture Notes in Computer Science 920, E. Balas and J. Clausen (eds.), Springer, Berlin, 157-171. In the embodiment described above, the nodes on the source node S side of the minimum boundary/cut become the target subgraph C.

In another alternate embodiment, if the graph embedding module 202 receives the lower bound value L and the upper bound value U of the target subgraph C and transmits the values to the boundary generating module 204, and if the target subgraph C is bounded by a small quotient cut, as described above, then the boundary generating module 204 first makes a conceptual copy of the graph G. Subsequently, the boundary generating module 204 contracts the first L nodes in the ordering of nodes within the embedded graph G into a single sink node T. The boundary generating module 204 then contracts the final N-U nodes in the ordering of nodes into a single source node S. In addition, every non-contracted graph node is connected to the sink node T by a new edge whose capacity value is a parameter lambda.

Thus, the resulting parametric ST maximum flow problem may be solved to obtain the smallest value of lambda from which one obtains a non-trivial boundary/cut and the minimum boundary/cut itself using one of many known techniques, described, for example, in "A Fast Parametric Maximum Flow Algorithm and Applications," by Gallo, G., Grigoriadis, M. D., and Tarjan, R. E., in SIAM J. Comput. 18, 1 (February 1989), 30-55. In the embodiment described above, the nodes on the sink node T side of the minimum boundary/cut become the target subgraph C.

Figure 5:
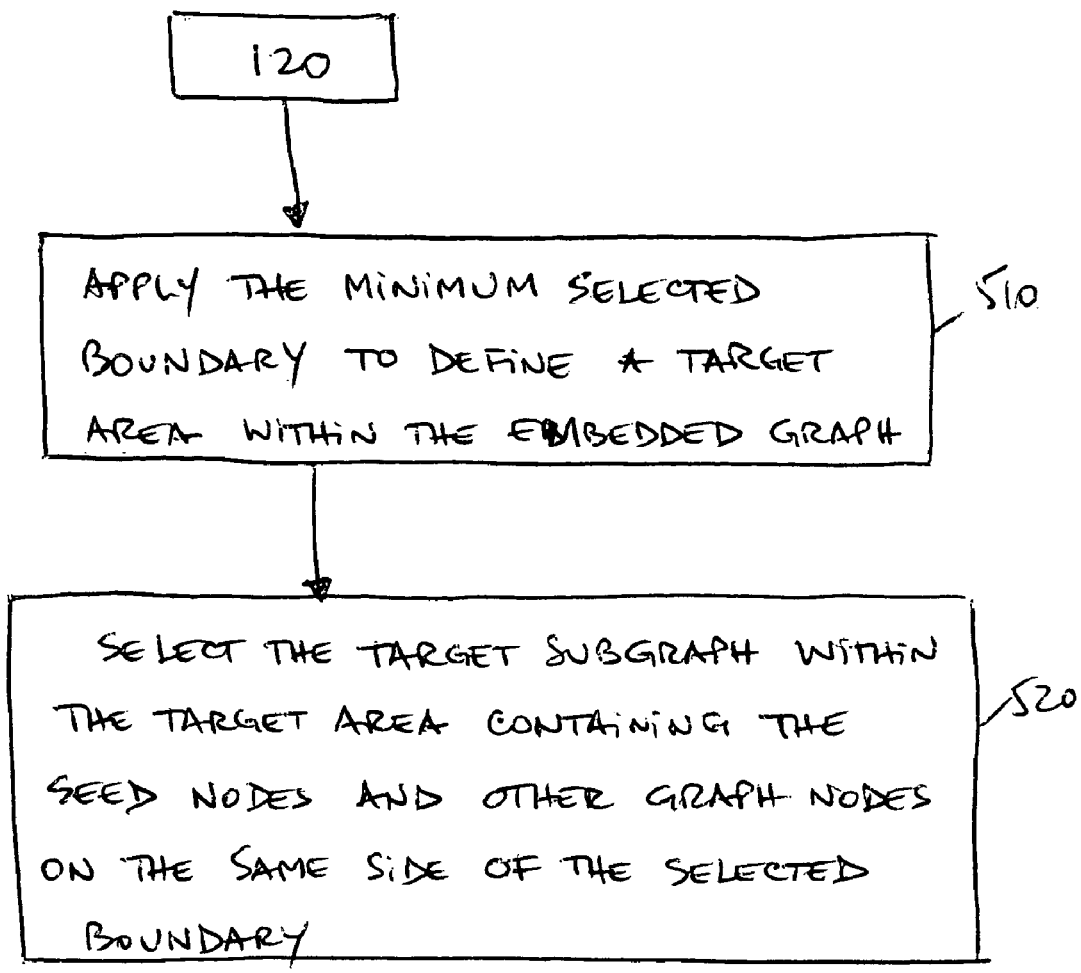
FIG. 5 is a flow diagram illustrating a method to select a target subgraph within the target area of the embedded graph, according to one embodiment of the invention.

FIG. 5 is a flow diagram illustrating a method to select a target subgraph within the target area of the embedded graph, according to one embodiment of the invention. As shown in FIG. 5, at processing block 510, the minimum selected boundary is applied to define a target area within the embedded graph. In one embodiment, the target subgraph selector module 206 receives the minimum boundary/cut and applies the boundary to the embedded graph to define two distinct areas within the embedded graph. The area containing the set of seed nodes is defined as the target area for the target subgraph C.

At processing block 520, the target subgraph within the target area is selected, the target subgraph containing the set of seed nodes and other graph nodes located on the same side of the selected minimum boundary. In one embodiment, the target subgraph selector module 206 selects the set of seed nodes and any additional nodes located on the same side defined by the applied boundary/cut to form the target subgraph C within the embedded graph.

Figure 6:
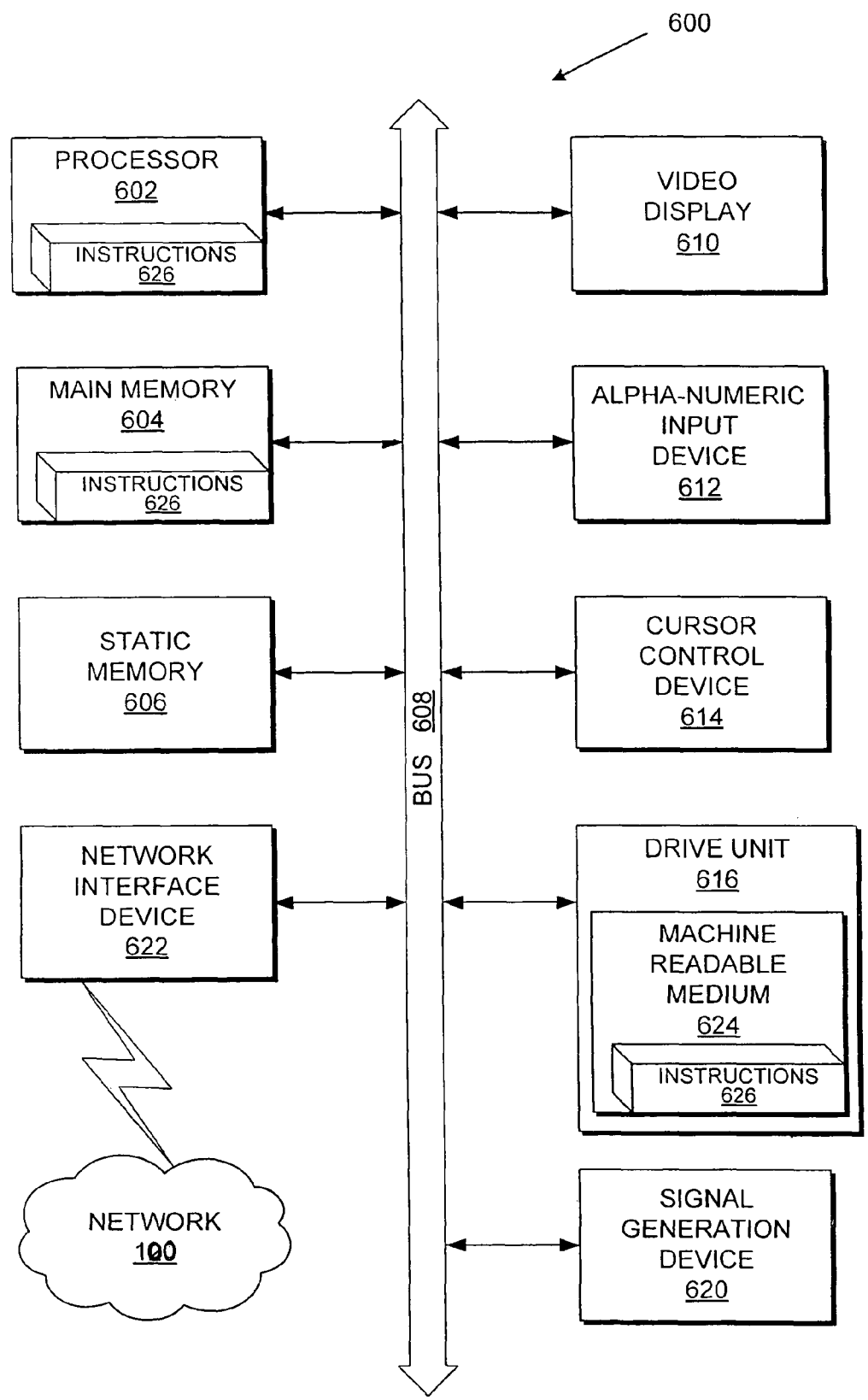
FIG. 6 is a diagrammatic representation of a machine in the exemplary form of a computer system within which a set of instructions may be executed and which may contain the system to identify target node graphs from predetermined seed node subsets.

FIG. 6 shows a diagrammatic representation of a machine in the exemplary form of a computer system 600 within which a set of instructions, for causing the machine to perform any one of the methodologies discussed above, may be executed. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 600 includes a processor 602, a main memory 604 and a static memory 606, which communicate with each other via a bus 608. The computer system 600 may further include a video display unit 610 (e.g., a liquid crystal display (LCD) or a cathode ray tube (CRT)). The computer system 600 also includes an alphanumeric input device 612 (e.g., a keyboard), a cursor control device 614 (e.g., a mouse), a disk drive unit 616, a signal generation device 618 (e.g., a speaker), and a network interface device 620.

The disk drive unit 616 includes a machine-readable medium 624 on which is stored a set of instructions (i.e., software) 626 embodying any one, or all, of the methodologies described above. The software 626 is also shown to reside, completely or at least partially, within the main memory 604 and/or within the processor 602. The software 626 may further be transmitted or received via the network interface device 620.

It is to be understood that embodiments of this invention may be used as or to support software programs executed upon some form of processing core (such as the CPU of a computer) or otherwise implemented or realized upon or within a machine or computer readable medium. A machine readable medium includes any mechanism for storing information in a form readable by a machine (e.g., a computer). For example, a machine readable medium includes read-only memory (ROM); random access memory (RAM); magnetic disk storage media; optical storage media; flash memory devices; electrical, optical or acoustical, or any other type of media suitable for storing information.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A method comprising:

calculating a one-sided spectral embedding of a graph by using a predetermined set of seed nodes within said graph, receiving said predetermined set of seed nodes, and ordering a plurality of nodes within said graph based on a distance parameter to each seed node of said predetermined set of seed nodes;

identifying a boundary within said embedded graph to define a target area for a target subgraph within said graph using predetermined network-flow calculations; and identifying said target subgraph based on said calculated boundary by applying said boundary to said ordering of said plurality of nodes within said graph to define two areas within said embedded graph, and selecting said target subgraph within one area of said embedded graph which contains said set of seed nodes and additional graph nodes located on the same side of said boundary.

2. The method according to claim 1, wherein identifying said boundary further comprises:
selecting a sliding window covering a predetermined number of nodes of said plurality of ordered nodes within the graph;
successively calculating a boundary value corresponding to each position of said sliding window across said distribution of ordered graph nodes to obtain a set of boundary values; and
selecting a minimum boundary value from said set of boundary values corresponding to said boundary within said embedded graph.

3. The method according to claim 1, wherein identifying said boundary further comprises:
receiving a lower bound value and an upper bound value defining a size of said target subgraph;
defining a source node containing a first number of nodes of said plurality of nodes within said graph equal to said lower bound value;
defining a sink node containing a second number of nodes of said plurality of nodes within said graph equal to said plurality of nodes minus said upper bound value; and
calculating a maximum flow value from said source node to said sink node and a minimum boundary value corresponding to said boundary within said embedded graph.

4. The method according to claim 1, wherein identifying said boundary further comprises:
receiving a lower bound value and an upper bound value defining a size of said target subgraph;
defining a sink node containing a first number of nodes of said plurality of nodes within said graph equal to said lower bound value;
defining a source node containing a second number of nodes of said plurality of nodes within said graph equal to said plurality of nodes minus said upper bound value; and
calculating a minimum boundary value corresponding to said boundary within said embedded graph.

5. A system comprising:
a graph embedding module to calculate a one-sided spectral embedding of a graph by using a predetermined set of seed nodes within said graph, receiving said predetermined set of seed nodes, and ordering a plurality of nodes within said graph based on a distance parameter to each seed node of said predetermined set of seed nodes;
a boundary generating module coupled to said graph embedding module to identify a boundary within said embedded graph to define a target area for a target subgraph within said graph using predetermined network-flow calculations; and
a target subgraph selector module coupled to said boundary generating module to identify said target subgraph based on said calculated boundary by applying said boundary to said ordering of said plurality of nodes within said graph to define two areas within said embedded graph, and selecting said target subgraph within one area of said embedded graph which contains said set of seed nodes and additional graph nodes located on the same side of said boundary.

6. The system according to claim 5, wherein said boundary generating module further selects a sliding window covering a predetermined number of nodes of said plurality of ordered nodes within the graph, successively calculates a boundary value corresponding to each position of said sliding window across said distribution of ordered graph nodes to obtain a set of boundary values, and selects a minimum boundary value from said set of boundary values corresponding to said boundary within said embedded graph.

7. The system according to claim 5, wherein said boundary generating module further receives a lower bound value and an upper bound value defining a size of said target subgraph, defines a source node containing a first number of nodes of said plurality of nodes within said graph equal to said lower bound value, defines a sink node containing a second number of nodes of said plurality of nodes within said graph equal to said plurality of nodes minus said upper bound value, and calculates a maximum flow value from said source node to said sink node and a minimum boundary value corresponding to said boundary within said embedded graph.

8. The system according to claim 5, wherein said boundary generating module further receives a lower bound value and an upper bound value defining a size of said target subgraph, defines a sink node containing a first number of nodes of said plurality of nodes within said graph equal to said lower bound value defines a source node containing a second number of nodes of said plurality of nodes within said graph equal to said plurality of nodes minus said upper bound value, and calculates a minimum boundary value corresponding to said boundary within said embedded graph.

9. A computer readable medium containing executable instructions, which, when executed in a processing system, cause said processing system to perform a method comprising:
calculating a one-sided spectral embedding of a graph by using a predetermined set of seed nodes within said graph, receiving said predetermined set of seed nodes, and ordering a plurality of nodes within said graph based on a distance parameter to each seed node of said predetermined set of seed nodes;
identifying a boundary within said embedded graph to define a target area for a target subgraph within said graph using predetermined network-flow calculations; and
identifying said target subgraph based on said calculated boundary by applying said boundary to said ordering of said plurality of nodes within said graph to define two areas within said embedded graph, and selecting said target subgraph within one area of said embedded graph which contains said set of seed nodes and additional graph nodes located on the same side of said boundary.

10. The computer readable medium according to claim 9, wherein identifying said boundary further comprises:
selecting a sliding window covering a predetermined number of nodes of said plurality of ordered nodes within the graph;
successively calculating a boundary value corresponding to each position of said sliding window across said distribution of ordered graph nodes to obtain a set of boundary values; and
selecting a minimum boundary value from said set of boundary values corresponding to said boundary within said embedded graph.

11. The computer readable medium according to claim 9, wherein identifying said boundary further comprises:
receiving a lower bound value and an upper bound value defining a size of said target subgraph;
defining a source node containing a first number of nodes of said plurality of nodes within said graph equal to said lower bound value;
defining a sink node containing a second number of nodes of said plurality of nodes within said graph equal to said plurality of nodes minus said upper bound value; and calculating a maximum flow value from said source node to said sink node and a minimum boundary value corresponding to said boundary within said embedded graph.

12. The computer readable medium according to claim 9, wherein identifying said boundary further comprises:

receiving a lower bound value and an upper bound value defining a size of said target subgraph;

defining a sink node containing a first number of nodes of said plurality of nodes within said graph equal to said lower bound value;

defining a source node containing a second number of nodes of said plurality of nodes within said graph equal to said plurality of nodes minus said upper bound value; and calculating a minimum boundary value corresponding to said boundary within said embedded graph.

13. A method comprising:

calculating a one-sided spectral embedding of a graph by using a predetermined set of seed nodes within said graph, receiving said predetermined set of seed nodes, and ordering a plurality of nodes within said graph based on a distance parameter to each seed node of said predetermined set of seed nodes;

identifying a boundary within said embedded graph to define a target area for a target subgraph within said graph by using predetermined network-flow calculations, selecting a sliding window covering a predetermined number of nodes of said plurality of ordered nodes within the graph, successively calculating a boundary value corresponding to each position of said sliding window across said distribution of ordered graph nodes to obtain a set of boundary values, and selecting a minimum boundary value from said set of boundary values corresponding to said boundary within said embedded graph; and identifying said target subgraph based on said calculated boundary.

\* \* \* \* \*